United States Patent
Vogel et al.

(10) Patent No.: US 9,908,091 B2
(45) Date of Patent: Mar. 6, 2018

(54) FURNACE WITH REACTOR TUBES HEATABLE ELECTRICALLY AND BY MEANS OF COMBUSTION FUEL FOR STEAM REFORMING A FEEDSTOCK CONTAINING HYDROCARBON

(71) Applicants: Wolfgang Vogel, Gauting (DE); Rachid Mabrouk, München (DE); Christoph Stiller, Fürstenfeldbruck (DE); Stefan Hübner, München (DE); Harald Ranke, Pöcking (DE); Andreas Seliger, München (DE)

(72) Inventors: Wolfgang Vogel, Gauting (DE); Rachid Mabrouk, München (DE); Christoph Stiller, Fürstenfeldbruck (DE); Stefan Hübner, München (DE); Harald Ranke, Pöcking (DE); Andreas Seliger, München (DE)

(73) Assignee: Linde Aktiengesellschaft, Munich (DE)

( * ) Notice: Subject to any disclaimer, the term of this patent is extended or adjusted under 35 U.S.C. 154(b) by 238 days.

(21) Appl. No.: 15/059,330

(22) Filed: Mar. 3, 2016

(65) Prior Publication Data
US 2016/0288074 A1 Oct. 6, 2016

(51) Int. Cl.
*B01J 8/06* (2006.01)
*C01B 3/38* (2006.01)

(52) U.S. Cl.
CPC .............. *B01J 8/067* (2013.01); *B01J 8/062* (2013.01); *C01B 3/38* (2013.01); *C01B 3/384* (2013.01); *B01J 2208/00168* (2013.01); *B01J 2208/00407* (2013.01); *B01J 2208/00415* (2013.01); *B01J 2208/00504* (2013.01); *B01J 2208/065* (2013.01); *C01B 2203/0233* (2013.01); *C01B 2203/085* (2013.01);
(Continued)

(58) Field of Classification Search
CPC ....... C01B 2203/0811; C01B 2203/085; C01B 2203/0866; C01B 3/384; C01B 2203/0816; C01B 2203/0855; B01J 2208/00168; B01J 2208/00407; B01J 2208/00415; B01J 2208/00504; B01J 2208/065; B01J 2219/00132; B01J 2219/00157; B01J 8/062; B01J 8/067
See application file for complete search history.

(56) References Cited

U.S. PATENT DOCUMENTS 3,419,362 A * 12/1968 Chevion ................ C01B 3/384
    122/510
4,690,743 A *  9/1987 Ethington ............. B01J 19/088
    204/168

(Continued)

*Primary Examiner* — Imran Akram
(74) *Attorney, Agent, or Firm* — Joshua L. Cohen

(57) ABSTRACT

A furnace for steam reforming a feed stream containing hydrocarbon, preferably methane, having: a combustion chamber, a plurality of reactor tubes arranged in the combustion chamber for accommodating a catalyst and for passing the feed stream through the reactor tubes, and at least one burner which is configured to burn a combustion fuel in the combustion chamber to heat the reactor tubes. In addition at least one voltage source is provided which is connected to the plurality of reactor tubes in such a manner that in each case an electric current which heats the reactor tubes to heat the feedstock is generable in the reactor tubes.

14 Claims, 3 Drawing Sheets

(52) U.S. Cl.
CPC ............... *C01B 2203/0811* (2013.01); *C01B 2203/0816* (2013.01); *C01B 2203/0866* (2013.01)

(56) References Cited

U.S. PATENT DOCUMENTS

| | | | | |
|---|---|---|---|---|
| 5,894,728 | A * | 4/1999 | Wakamoto | B01D 53/9409 60/286 |
| 2005/0244682 | A1* | 11/2005 | Meacham | H01M 8/04007 429/425 |
| 2007/0071662 | A1* | 3/2007 | Kawakita | B01J 12/007 422/199 |
| 2009/0123797 | A1* | 5/2009 | Kaye | B01J 8/0214 429/424 |
| 2009/0199475 | A1* | 8/2009 | DeVries | C01B 3/386 48/116 |
| 2012/0145965 | A1* | 6/2012 | Simmons | C01B 3/24 252/373 |
| 2014/0079626 | A1* | 3/2014 | Ji | C01B 3/02 423/648.1 |

\* cited by examiner

FURNACE WITH REACTOR TUBES HEATABLE ELECTRICALLY AND BY MEANS OF COMBUSTION FUEL FOR STEAM REFORMING A FEEDSTOCK CONTAINING HYDROCARBON

The invention relates to a furnace, for example for carrying out steam reforming of a feed gas stream containing hydrocarbon, and to a corresponding method.

Steam reforming, in particular of methane, is a widely used, established technology for producing synthesis gas. Steam reforming is also currently in particular preferred over other methods for producing hydrogen.

Steam reforming is an allothermic reaction which, for example in the case of natural gas or methane as feedstock, proceeds according to the following reaction equation in the presence of a suitable catalyst:

$$CH_4 + H_2O \rightarrow CO + 3H_2.$$

The reaction is carried out by mixing preferably hot steam with the feedstock (for example natural gas or methane) to be reformed and, with constant input of energy by combusting a combustion fuel, reacting the mixture in the presence of the catalyst in the gas phase to yield synthesis gas or hydrogen.

At present, however, demand is rising for synthesis gas and hydrogen which are "green", i.e. produced in an environmentally friendly manner. Currently, electrolysis is the only available method for producing green hydrogen from renewable electricity but this method is disadvantageous due to its comparatively high costs.

Against this background, the object of the invention is that of providing an apparatus or method for producing synthesis gas, in particular hydrogen, which is improved with regard to the above-stated problem.

Said object and advantageous embodiments of the invention are achieved by a furnace having the features described below.

Accordingly, the invention provides a furnace for steam reforming a feedstock containing hydrocarbon, preferably comprising methane, the furnace having:
a combustion chamber,
a plurality of reactor tubes arranged in the combustion chamber for accommodating a catalyst and for passing the feedstock through the reactor tubes,
at least one burner which is configured to combust a combustion fuel in the combustion chamber to heat the reactor tubes, wherein
in addition to the at least one burner, at least one voltage source is provided which is connected to the plurality of reactor tubes in such a manner that in each case an electric current which heats the reactor tubes to heat the feedstock is generable in the reactor tubes.

The technical feature according to which the reactor tubes are arranged in the combustion chamber should be taken to mean that at least portions of the reactor tubes extend in the combustion chamber, such that heat generated there may be transferred to the reactor tubes.

The invention thus makes use of established steam reforming technology for producing synthesis gas or hydrogen, wherein on the basis of the teaching according to the invention the advantageous possibility arises, for example in the presence of surplus electrical energy or renewable electrical energy, to save at least some of the combustion fuel and to assist or temporarily replace heating of the feed stream by direct electrical heating of the reactor tubes.

According to a preferred embodiment of the furnace according to the invention, M outer conductors L1, ..., LM are provided, wherein the at least one voltage source is configured to provide an alternating voltage to each of the M outer conductors L1, ..., LM, wherein M is a natural number greater than or equal to two and wherein these alternating voltages are phase-shifted relative to one another by $2\pi/M$.

A preferred embodiment of the furnace according to the invention furthermore provides that the reactor tubes open into a manifold, via which a crude stream of product gas or synthesis gas from steam reforming which is taking place in the reactor tubes in the presence of a suitable catalyst may be drawn off from the reactor tubes.

The reactor tubes are preferably arranged parallel to one another and in each case extend along a longitudinal or cylinder axis which extends parallel to the vertical. Relative to the vertical, the manifold is arranged below and outside the combustion chamber and preferably extends transversely of the reactor tubes or along the horizontal. The reactor tubes and/or the manifold may at least in part be of hollow-cylindrical, preferably hollow circular cylindrical, construction. Other cross-sectional shapes are also conceivable. The reactor tubes and the manifold furthermore consist of an electrically conductive material or comprise at least one such material, such that the reactor tubes may be heated by generating an electric current or Joule heating in the reactor tubes.

A preferred embodiment of the furnace according to the invention provides that the outer conductors L1, ..., LM are each connected to an associated reactor tube. This should be taken to mean that each outer conductor is electrically conductively connected to a dedicated reactor tube, such that the outer conductors are divided between a corresponding number of reactor tubes. The outer conductors are here preferably connected to the M reactor tubes in such a manner that a star connection is formed, in which the neutral point is conveniently formed by the manifold or the manifold includes the neutral point. The neutral point may be grounded.

A star connection is understood here, as is generally conventional, to mean an interconnection of an arbitrary number of terminal connections (M terminal connections, an optionally present neutral conductor also possibly being connected to the neutral point), in each case via a resistor, to a common point, which is denoted the neutral point. Advantageously, when the M (for example M=3) outer conductors are under uniform load, the neutral point passes no current (in the case of a nonuniform load only the difference between the currents or, in the case of a high-resistance connection of the neutral conductor to the neutral point of the at least one tube, a differential voltage).

Said reactor tubes are preferably configured such that i.e. identically constructed in such a manner that the currents cancel each other out at the neutral point, i.e. at the manifold. In other words, the resulting electrically conductive connections (which in each case comprise at least part of the reactor tube in question) between the respective outer conductor of the at least one voltage source and the neutral point or manifold have the same ohmic resistance, such that the individual currents cancel each other out at the neutral point or at the manifold and the manifold remains current-free.

One advantage of the technical teaching according to the invention is that a conventional steam reformer or furnace may be retrofitted with the electrical heating according to the invention. The currents which arise during heating of the reactor tubes may be in the range from 6000 to 8000 amperes. The voltages provided at the outer conductors may be in the range from 30 volts to 50 volts and may be controlled, for example, by upstream thyristor controllers.

According to a preferred embodiment, M=3, i.e. the at least one voltage source takes the form of a three-phase alternating voltage source, such that the current generated in the respective reactor tube for direct Joule heating of the respective reactor tube is a three-phase alternating current, which is often also referred to as rotary current.

This is a multiphase alternating current which, as is known, consists of three individual alternating currents or alternating voltages of identical frequency:

$U_{L1}=U_0 \cos(\omega t)$, $U_{L2}=U_0 \cos(\omega t-120°)$, $U_{L3}=U_0 \cos(\omega t-240°)$, the phase angles of which are shifted relative to one another by a fixed amount of 120°, i.e. $2\pi/3$.

The alternating voltages reach their maximum excursion with a time offset of one third of a period relative to one another. The time shift of these "outer conductor voltages" relative to one another is described by a phase shift angle. The three conductors are known as outer conductors and conventionally abbreviated L1, L2 and L3, A neutral conductor, if present, is designated N.

The invention is here in each case described on the basis of M reactor tubes or three reactor tubes. Substantially more reactor tubes may, of course, also be heated by the present technical teaching, such a number of reactor tubes ideally being a multiple of M or three.

In this case, M (for example three) outer conductors of a voltage source with M (for example three) associated reactor tubes are in each case electrically conductively connected in the above-described manner, M reactor tubes may in each case be supplied by means of a dedicated, associated voltage source (for example transformer) (a plurality of voltage sources may thus be used). All the currents are then preferably neutralized at the manifold, such that the manifold remains current-free ("neutral point").

A voltage source for the purposes of the present invention is also taken to mean a transfer point at which the M phases are provided. The necessary voltages may optionally also be generated outside the boundary of the plant and be transported to the furnace or plant. The voltages are preferably provided locally by means of transformers, wherein one transformer is present in each case for three reactor tubes (rotary current with M=3) (or for M reactor tubes in the case of M phases).

A preferred embodiment of the furnace according to the invention provides that each outer conductor has an end region via which it is electrically conductively connected to a contact region of the associated reactor tube.

The outer conductors or feed lines may, of course, be embodied by any conceivable suitable line connections. A preferred embodiment of the furnace according to the invention provides in this respect that each outer conductor at least in places has a first and, connected in parallel thereto, a second electrical conductor, wherein the two electrical conductors in each case have an end region which is electrically conductively connected to a contact region of the respectively associated reactor tube.

One embodiment of the furnace according to the invention preferably provides that the respective end region is connected to the contact region of the associated reactor tube for example via a press-fit connection, welded connection or another suitable connection.

A preferred embodiment of the furnace according to the invention provides that the contact regions of the reactor tubes in each case project from, a jacket of the respective reactor tube transversely of the longitudinal axis of the respective reactor tube. The two end regions of the respective first and second conductors may in each case be fixed thereto.

A further preferred embodiment of the furnace according to the invention provides that the contact regions of the reactor tubes extend outside the combustion chamber along the verticals or along the longitudinal axes of the reactor tubes above the combustion chamber.

Another preferred embodiment of the furnace according to the invention provides that the reactor tubes in places have a cross-sectional thickening in the region of the respective contact region, for example have an enlarged external diameter with a constant internal diameter, wherein the thickness of the tube in the region of the cross-sectional thickening may for example be twice that of the tube outside the cross-sectionally thickened tube portion. The cross-sectional thickening may furthermore be, for example, a circumferential flange. The respective cross-sectional thickening includes the respective contact region of the reactor tube in question and is preferably provided above an upper or the uppermost wall of the combustion chamber. Thanks to the cross-sectional thickening, the resistance of the reactor tube is reduced in this portion of the reactor tube outside the furnace, such that less Joule heating occurs in this portion, where it is not wanted.

A further preferred embodiment of the furnace according to the invention provides a cooling device which is configured to cool the outer conductors or the respective first and the second electrical conductors by means of a fluid coolant, for example water. A fluid coolant is here taken to mean a flowable, preferably a liquid and/or gaseous cooling medium.

A further preferred embodiment of the furnace according to the invention provides that the outer conductors or the first and the second conductors each form a flow duct which is configured to guide the fluid coolant.

An alternative preferred embodiment of the furnace according to the invention furthermore provides that the outer conductor or the first and the second conductors are each surrounded by a sleeve preferably taking the form of electrical insulation, wherein the respective sleeve here defines a flow duct which is configured to guide the fluid coolant.

A further preferred embodiment of the furnace according to the invention provides that the How duet associated with the respective first conductor is fluidically connected adjacent the contact region in question, to the flow duct associated with the respective second conductor, such that the fluid coolant is guidable via the one flow path to the contact region and via the other flow path away from the contact region.

In other words, a first and, connected in parallel thereto, a second conductor is connected to a contact region of the associated reactor tube, wherein the flow duct associated with the first conductor is used to guide the fluid coolant to the contact region and wherein the flow duct associated with the second conductor is then used to guide the fluid coolant back away from the contact region (the roles of the two flow channels may here, of course, also be interchanged), in this manner, it is possible to create a coolant circuit which permits continuous cooling of the respective outer conductor or of the first and second conductors constituting said outer conductor.

A further aspect of the invention relates to a method for steam reforming.

The method according to the invention preferably uses a furnace according to the invention and may be further developed with reference to the above-described features.

The method according to the invention provides that a feed stream containing hydrocarbon, preferably comprising methane, and comprising steam is guided through reactor tubes of a furnace and there reacted in the presence of a suitable catalyst arranged in the reactor tubes to yield a crude synthesis gas stream comprising CO and $H_2$, wherein the feed stream in the reactor tubes is guided through a combustion chamber in which a combustion fuel is combusted to heat the feed stream. According to the invention:

- at least temporarily, the feed stream in the reactor tubes is additionally heated by in each case generating an electric current in the reactor tubes which heats the reactor tubes to heat the feed stream, or
- at least temporarily, instead of heating the feed stream by combusting the combustion fuel, in each case an electric current which heats the reactor tubes to heat the feed stream is generated in the reactor tubes.

Preferably, less combustion fuel is consumed per unit time if the feed stream is additionally or completely heated by direct electrical heating of the reactor tubes.

The outer conductors are furthermore preferably cooled by means of a fluid coolant, for example water (see above).

Hotspots on the reactor tubes in the region of the contact regions are preferably avoided by providing an appropriate cross-sectional thickening of the reactor tubes or an appropriate reactor tube portion with a lower resistance (see above).

In the following description of exemplary embodiments, further features and advantages of the invention will be explained with reference to the figures.

Figure 1:
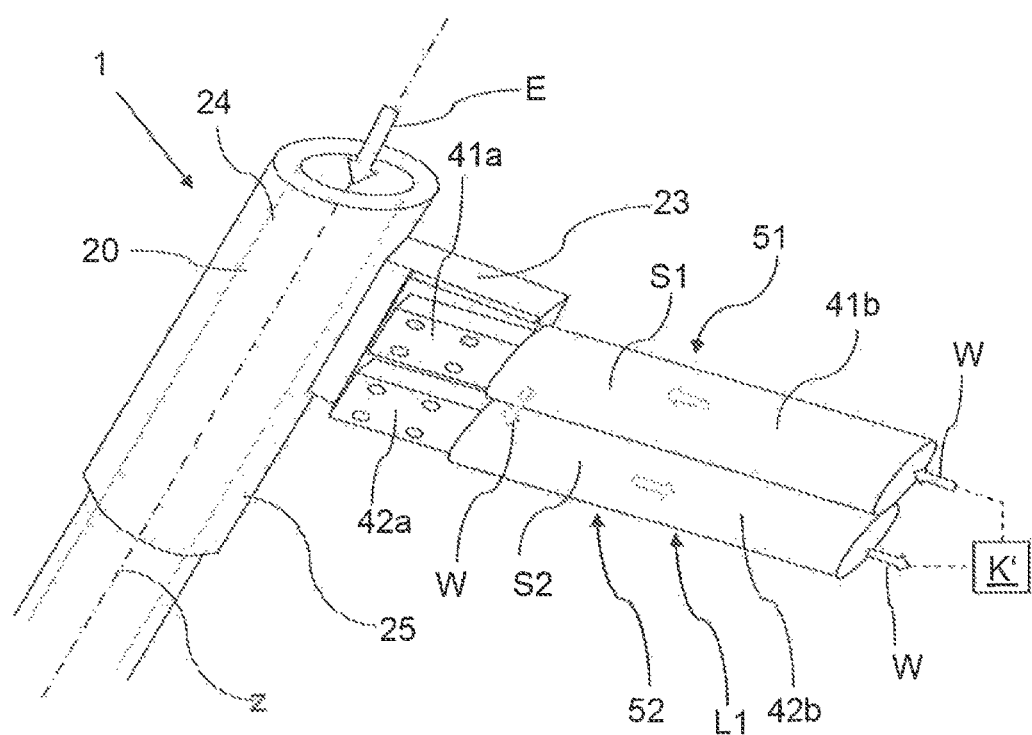
FIG. 1 is a partial, perspective representation of a reactor tube with connected external conductor, which is here formed by a first and a second conductor or inner conductor of two cooled power cables which are connected in parallel and are fixed to a contact region of the reactor tube, such that an electrically conductive connection is produced between the outer conductor and the reactor tube.
Figure 2:
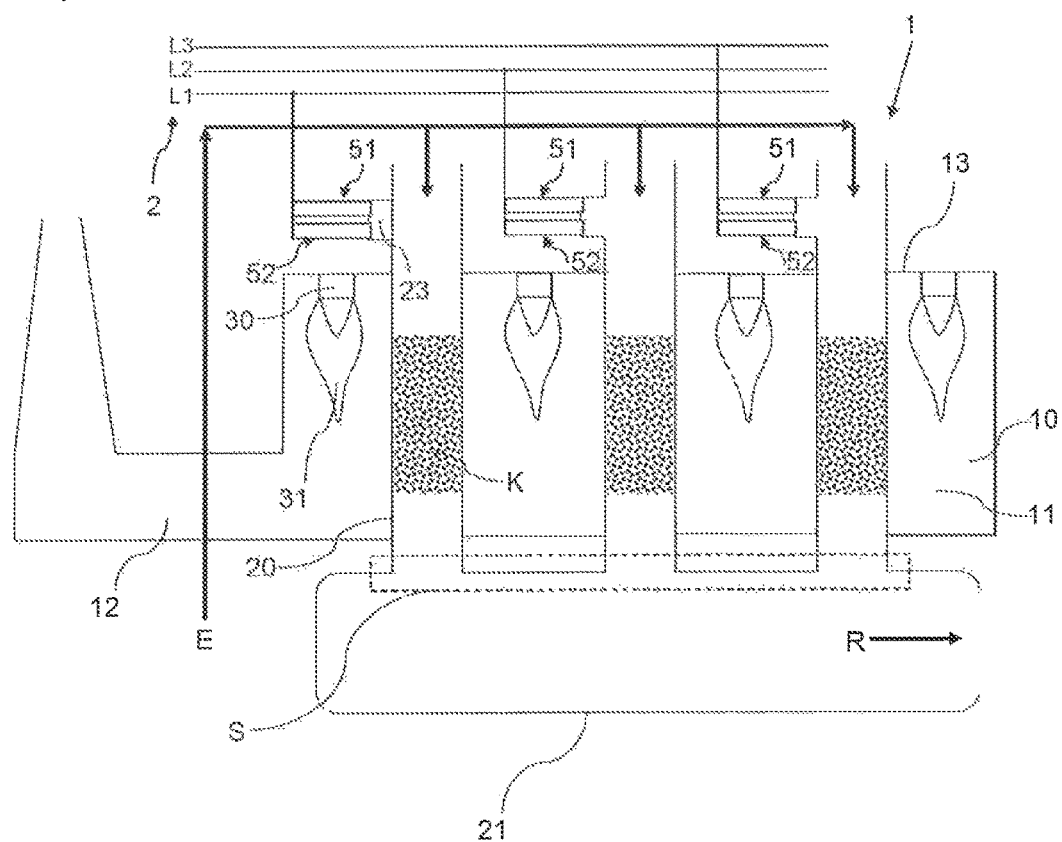
FIG. 2 is a schematic cross-sectional view of a furnace according to the invention with reactor tubes of the kind shown in FIG. 1.

FIG. 1 shows in conjunction with FIG. 2 a furnace 1 according to the invention for steam reforming a feed stream E containing hydrocarbon, which stream preferably comprises methane. The furnace 1 has a combustion chamber 10 which has a radiation zone 11 and a convection zone 12. In the radiation zone 11, burners 30 are provided for example on an upper horizontal wall 13 of the combustion chamber 10, which burners are designed to combust a combustion fuel in the presence of oxygen in the combustion chamber 10 or radiation zone 11, wherein the resultant heat is transferred to a plurality of reactor tubes 20, just three of which are shown here for simplicity's sake. The reactor tubes 20 each extend along a vertical longitudinal axis z through the radiation zone 11 of the combustion chamber 10. A catalyst K is provided in the reactor tubes 20. The heat generated in the radiation zone 11 is such that the feed stream E introduced into the reactor tubes 20, which stream has previously been preheated in the convection zone 12 of the furnace 1 or combustion chamber 10, is reacted by steam reforming in the reactor tubes 20 using said heat to yield a crude synthesis gas stream R which comprises CO and $H_2$.

The reactor tubes 20 here open into a manifold 21 which is provided below the combustion chamber 10 and via which the crude synthesis gas stream R which has been produced may be drawn off from the furnace 1 or reactor tubes 20.

The reformed gas R leaves the radiation zone 11 of the reformer furnace 1 generally for example in a temperature range of 780° C. to 1050° C., preferably 820° C. to 950° C. The pressure range of the gas is preferably in the range from 10 bar to 50 bar, preferably 15 to 40 bar.

According to the invention, the furnace 1 now comprises, in addition to the burners 30, at least one voltage source 2 which in the present case is a three-phase alternating voltage source. Said source is electrically conductively connected via its outer conductors L1, L2 and L3 or in each case two parallel-connected power cables 51, 52 to a reactor tube 20, such that when voltages are applied an electric current which heats the reactor tubes 20 to heat the feed stream E is in each case generated in the corresponding reactor tube 20.

According to the invention, the feed stream E may thus be heated by electrical energy instead of or in addition to the combustion fuel. The electrical energy is preferably surplus energy, for example in the form of renewable energy sources (for example solar or wind energy).

According to one embodiment of the invention, in a first operating mode of the furnace 1 a tail or exhaust gas containing flammable substances such as for example CO, $CH_4$, and/or $H_2$ is combusted together with natural gas, wherein natural gas here preferably makes up 10% to 30% of the entire fuel combusted in the first operating mode arid is furthermore used as feedstock for the steam reforming. The tail or exhaust gas preferably originates from a pressure swing adsorption process serving to purity a hydrogen product obtained during steam reforming.

The furnace 1 may furthermore be placed in a second (electrical) operating mode, in which the tail or exhaust gas is preferably still burned as combustion fuel, wherein instead of by burning natural gas the reactor tubes 20 are now additionally heated by the electrical heating according to the invention. The furnace 1 may be operated in the second operating mode for example for between 0 and 6 hours each day, such that surplus energy present in the grid may advantageously reliably be consumed.

As is clear from FIGS. 1 and 2, one or snore voltage sources 2 may be used which provide a three-phase alternating voltage on three outer conductors L1, L2 and L3. Each phase L1, L2 or L3 is associated with a dedicated reactor tube 20. This results in a star connection, in which the neutral point S is formed by the manifold 21 into which the tubes 20 open (the reactor tubes 20 are thus electrically conductively connected to the manifold 21). As a consequence, the manifold 21 preferably advantageously remains current-free. This principle may, of course, be applied to a larger number of reactor tubes 20 by in each case associating for example three reactor tubes 20 with the phases L1, L2 and L3 of a three-phase alternating voltage source 2 (where M phases are present, the phases are divided between M reactor tubes, see above).

According to FIG. 1, each outer conductor L1, L2 and L3 (FIG. 1 shows this by way of example with reference to L1) is advantageously formed at least in places by a first and, connected in parallel thereto, a second electrical conductor 41, 42. The first conductor 41 here forms an inner conductor of a first power cable 51, while the second conductor 42 forms an inner conductor of a second power cable 52. The two electrical conductors 41, 42 each have an end region 41a, 42a which is electrically conductively connected to a contact region 23 of the respectively associated reactor tube 20 (cf. FIG. 2). The respective end region 41a, 42a is here preferably electrically conductively connected to the contact region 23 of the associated reactor tube 20 via a press-fit or welded connection.

The individual contact regions 23 of the reactor tubes 20 each project transversely of a longitudinal axis z of the respective reactor tube 20 from a jacket 24 of the respective reactor tube 20 and may be formed in one piece on the respective jacket 24 or be welded thereto. The contact regions 23 are preferably provided outside the combustion chamber 10 on the reactor tubes 20, specifically along the vertical above the combustion chamber 10. The reactor tubes 20 or of the jackets 24 thereof here have a cross-sectional thickening 25, shown in FIG. 1, in the region of the respective contact region 23 and above said wall 13 of the combustion chamber 10. As a consequence, the resistance of the reactor tubes 20 falls in the region of the contact regions 23 of the reactor tubes 20, such that excessive heating of reactor tubes 20 may advantageously be suppressed at this point.

The feed lines for the voltages or currents to the reactor tubes 20, i.e. the outer conductors L1, L2 and L3 or the first and second conductors 41, 42, are preferably constructed with a distinctly lower resistance than the reactor tubes 20 in order to minimize heat generation in the feed lines or outer conductors, since this is generally unwanted.

In order to manage any evolution of heat in the outer conductors L1, L2 and L3 or in the first and second leads 41, 42 (power cables 51, 52), these should preferably be continuously cooled with a cooling device K' or with a fluid coolant W, preferably water. The first and second conductors 41, 42 may here themselves each form a flow duct S1, S2 which is configured to guide the fluid coolant W.

The first and second conductors 41, 42 are preferably each surrounded by a sleeve 41b, 42b, conveniently in the form of insulation of the respective power cable 51, 52. Instead of the inner conductors 41, 42, the respective sleeves 41b, 42b may define a flow duct S1 or S2 which is configured to guide the fluid coolant W.

The two flow channels S1, S2 are particularly preferably fluidically connected at the respective contact region 23 or in the vicinity thereof such that a cooling circuit may be provided for each outer conductor L1, L2 and L3 in which the coolant W may be conveyed to the respective contact region 23 (for example power cable 51 in FIG. 1) and away again (for example power cable 52 in FIG. 1).

Figure 3:
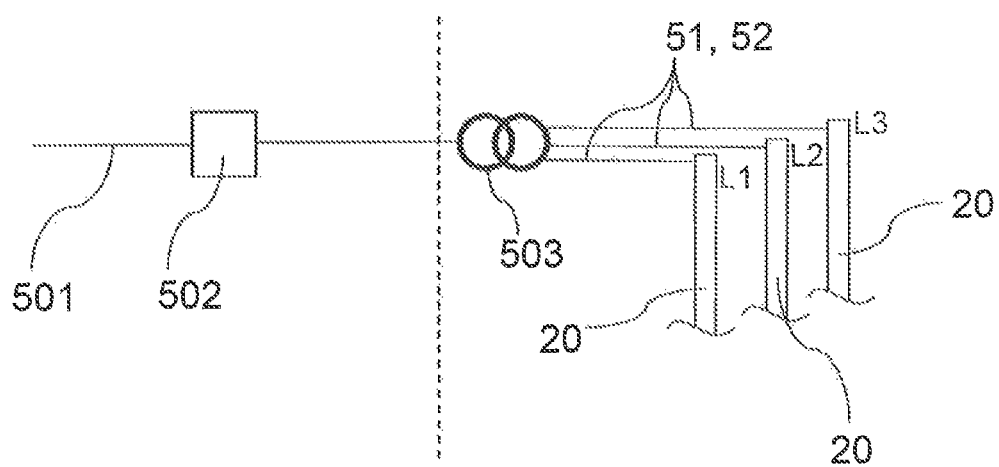
FIG. 3 is a schematic diagram of a possible power supply for the reactor tubes of a furnace according to the invention.

FIG. 3 shows by way of example a possible power supply of a furnace according to the invention, wherein the vertical dashed line denotes the separation between the region of the furnace 1 and for example a switching substation. According to FIG. 3, one transformer 503 is present for each three tubes, said transformer for example having a primary voltage of 690 V and a secondary voltage of 50 V for the respective phase (power consumption 630 kVA). The primary voltage (for example 690 V) is in each case supplied to the transformer 503 in question via a line 501 and via a three-phase thyristor controller 502, such that the secondary voltage may its each case be controlled in the range from 30 V to 50 V. From the respective transformer 503, the stepped down three-phase alternating voltage may be supplied by means of said power cables 51, 52 to the respective reactor tube 20 or contact region 23. The length of the power cables 51, 52 may for example be in a range from 10 m to 20 m. Other designs of power supply are, of course, also conceivable.

The furnace 1 to the invention is particularly suitable for carrying out the method according to the invention. In this respect the technical teaching of the present invention permits the feed stream E in the reactor tubes 20 for example to be temporarily heated in addition to firing by in each case generating an electric current, which heats the reactor tubes 20 to heat the feed stream E, in the reactor tubes 20 in the above-described manner. Furthermore, an electric current which heats the reactor tubes 20 to heat the feed stream E may be generated temporarily instead of firing. The invention thus advantageously permits surplus energy, in particular renewable (electrical) energy to be included in a steam reforming process.

LIST OF REFERENCE SIGNS

| | |
|---|---|
| 1 | Furnace |
| 2 | Voltage source |
| 10 | Combustion chamber |
| 11 | Radiation zone |
| 12 | Convection zone |
| 13 | Wall |
| 20 | Reactor tube |
| 21 | Manifold |
| 23 | Contact region |
| 24 | Jacket |
| 25 | Cross-sectional thickening |
| 30 | Burner |
| 41 | First conductor |
| 42 | Second conductor |
| 51 | First power cable |
| 52 | Second power cable |
| 41a, 42a | End region |
| 41b, 42b | Sleeve or insulation |
| 501 | Line |
| 502 | Thyristor controller |
| 503 | Transformer |
| K | Catalyst |
| K' | Cooling device |
| R | Crude synthesis gas stream |
| S1, S2 | Flow duct |
| W | Fluid coolant |
| Z | Longitudinal axis |

The invention claimed is:

1. A furnace for steam reforming a feed stream containing hydrocarbon, preferably comprising methane, comprising:
   a combustion chamber,
   a plurality of reactor tubes arranged in the combustion chamber accommodating a reforming catalyst and configured to pass the feed stream through the reactor tubes,
   at least one burner configured to burn a combustion fuel in the combustion chamber to heat the reactor tubes,
   at least one voltage source connected to the plurality of reactor tubes in such a manner that an electric current which heats the reactor tubes to heat the feedstock is generable in the reactor tubes, and
   M outer conductors, wherein M is a natural number greater than or equal to 2,
   wherein the at least one voltage source is configured to provide an alternating voltage to each of the M outer conductors, and
   wherein the alternating voltages are phase-shifted relative to one another by $2\pi/M$.

2. Furnace according to claim 1, characterized in that the reactor tubes open into a manifold.

3. Furnace according to claim 2, characterized in that the outer conductors are each electrically conductively connected to an associated reactor tube of the plurality of reactor tubes, such that a star connection is formed, in which the neutral point is formed by the manifold.

4. Furnace according to claim 3, characterized in that each outer conductor has an end region via which it is electrically conductively connected to a contact region of the associated reactor tube.

5. Furnace according to claim 4, characterized in that the respective end region is connected to the contact region of the associated reactor tube via a press-fit connection or welded connection.

6. Furnace according to claim 4, characterized in that the contact regions each project transversely of a longitudinal axis of the respective reactor tube from a jacket of the respective reactor tube.

7. Furnace according to claim 4, characterized in that the contact regions are provided on the reactor tubes outside the combustion chamber and above the combustion chamber.

8. Furnace according to claim 4, characterized in that the reactor tubes have a cross-sectional thickening at the respective contact region.

9. Furnace according to claim 8, characterized in that, the outer conductors or the first and second conductors are each surrounded by a sleeve in the form of insulation, wherein the respective sleeve defines a flow duct which is configured to guide the fluid coolant.

10. Furnace according to claim 3, characterized in that each outer conductor has a first and, connected in parallel thereto, a second electrical conductor, wherein each of the first and second electrical conductors have an end region which is electrically conductively connected to a contact region of the associated reactor tube.

11. Furnace according to claim 10, characterized in that the respective end region is connected to the contact region of the associated reactor tube via a press-fit connection or welded connection.

12. Furnace according to claim 10, characterized in that a cooling device is provided which is configured to cool the outer conductors or the first and second electrical conductors by means of a fluid coolant.

13. Furnace according to claim 12, characterized in that the outer conductors or the first and second conductors each form a flow duct which is configured to guide the fluid coolant.

14. Furnace according to claim 13, characterized in that the flow duct associated with the respective first conductor is fluidically connected adjacent the contact region to the flow duct associated with the respective second conductor, such that the fluid coolant is guidable via the one flow duct to the contact region and via a flow path away from the contact region.

* * * * *